June 4, 1963  G. W. CORSAN  3,092,348
SPOOLS FOR BUSINESS MACHINES
Filed June 27, 1960  2 Sheets-Sheet 1
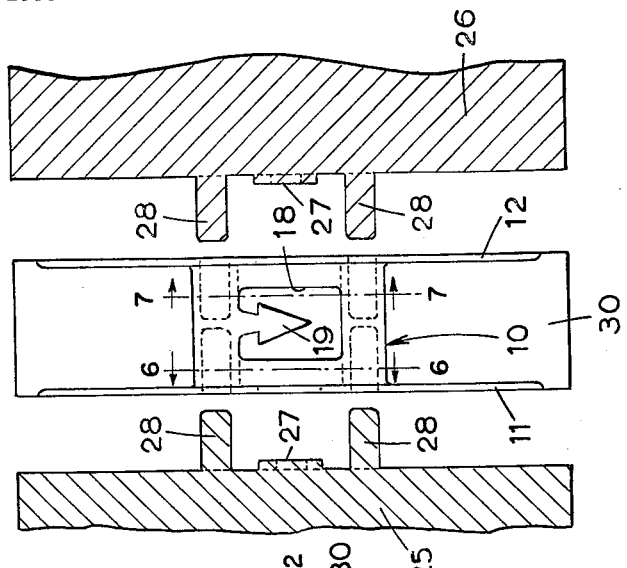
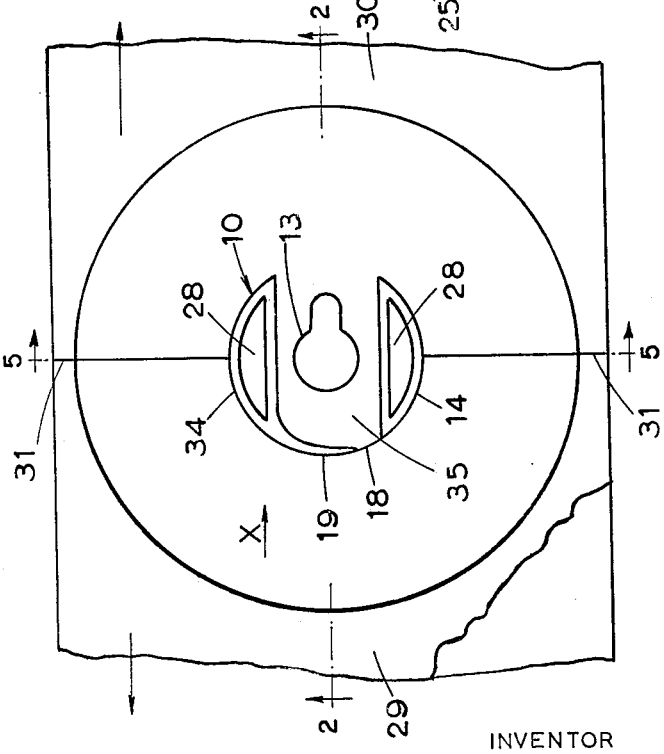
INVENTOR
GEORGE WILLIAM CORSAN
BY Silverman, Mullin + Corr
ATTORNEYS.

June 4, 1963   G. W. CORSAN   3,092,348
SPOOLS FOR BUSINESS MACHINES
Filed June 27, 1960   2 Sheets-Sheet 2
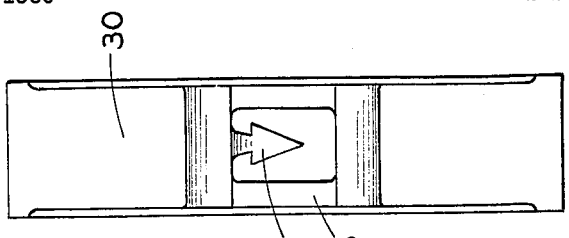
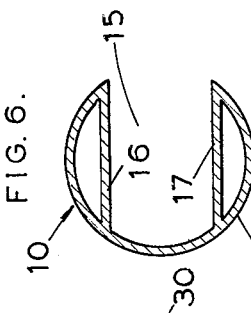
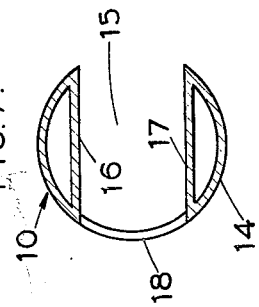
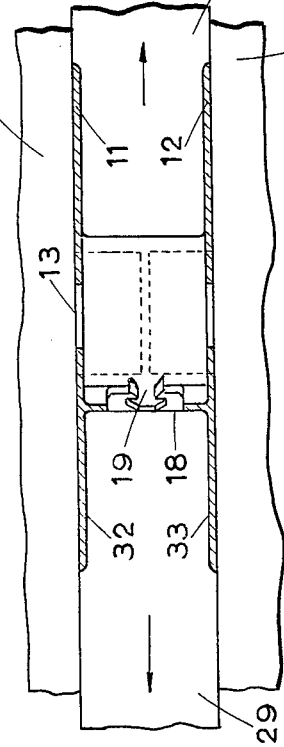
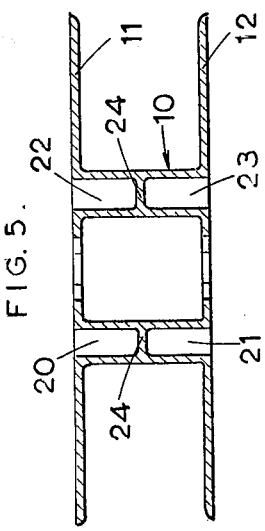
INVENTOR
GEORGE WILLIAM CORSAN
BY *Silverman, Mullin & Cass*
ATTORNEYS United States Patent Office 3,092,348
Patented June 4, 1963

3,092,348
SPOOLS FOR BUSINESS MACHINES
George William Corsan, Bexleyheath, England, assignor to Walter Grafton & Son Limited, London, England
Filed June 27, 1960, Ser. No. 38,967
Claims priority, application Great Britain June 26, 1959
6 Claims. (Cl. 242—74)

This invention relates to one-piece moulded or cast spools, and in particular to injection moulded spools for business machines such as typewriters.

The production of spools such as typewriter spools by injection moulding has already been attempted, but difficulty is experienced in the production of a spool having the required prongs and other parts in a manner that enables satisfactory moulding in plastic materials to be accomplished. Thus, it has already been proposed to form a plastic spool in a one-piece moulding with a prong of metal insert-moulded in the work piece, or attached by cementing substantially to the moulding step. It has also been proposed to provide a one-piece moulding having a prong formed in the wall of the hub but this has necessitated a large central core for use during the moulding steps, making it impracticable to provide a small diameter central hole, and, further such proposal has prevented the provision of driving holes or slots in the central area occupied by the large core.

It is an object of the present invention to overcome these drawbacks and to enable the moulding in one piece of a spool having the requisite prong or other element and having a small central hole the dimensions of which are not governed by the necessity to provide a large central core.

According to the present invention, a one-piece injection moulded or cast spool, for e.g. a typewriter ribbon, has a hub, the wall of said hub being formed at one point with a window having a prong extending peripherally around part of the hub, and at a diametrically opposite point with a passageway, and with two parallel chordal walls extending between the ends of the two windows.

Each chordal wall, with the associated adjacent peripheral wall of the hub, may define a recess, and the thicknesses of the flanges and of the hub walls are preferably substantially the same.

The invention will be described with reference to the accompanying drawings, in which:

FIGURE 1 is a diagrammatic plan view of three parts of a mould and a spool embodying the invention associated therewith, the fourth part being removed for clarity.

FIGURE 2 is a diagrammatic sectional elevational view of the mould on the line 2—2, FIGURE 1, showing a spool within said mould, FIGURE 3 is a diagrammatic side elevational view of three of the parts of the mould, with a spool therein, viewed in the direction of the arrow $x$, FIGURE 1 and with one part of the mould removed, FIGURE 4 is an end elevational view of a withdrawable core, viewed in the direction of the arrow $x$, FIGURE 1, FIGURE 5 is a sectional elevational view taken along the line 5—5, FIGURE 1, FIGURE 6 is a sectional view of the hub of a spool on the line 6—6, FIGURE 3, and FIGURE 7 is a sectional view on the line 7—7, FIGURE 3.

It will be convenient to describe the finished spool. Referring to the drawings, the spool is of one-piece construction and all the members are of substantially the same thickness, thus facilitating moulding. The spool consists of a hub 10 and two flanges 11, 12 the flanges being disc-like and each having a small central hole 13 of approximately keyhole shape, the diameter of the larger portion of the keyhole being approximately one third the diameter of the hub. The hub consists of a cylindrical outer wall 14 subtending about 290° of arc, so that said outer wall is of C-shape, the gap between the ends of the C subtending about 70° of arc. Extending chordally from the free ends of the C and parallel with one another, are two inner walls 16, 17 of the same thickness as the peripheral wall 14 of the hub, and there is demarcated between the two flanges 11, 12 and the two chordal walls 16, 17 a rectangular passageway 15 at one side of the hub. Diametrically opposite the passageway 15, there is a window 18 in the peripheral wall 14 of the hub, the dimensions of which may be as required, but are not greater than those of the passageway 15. The window 18 consists of a rectangular aperture having projecting transversely thereacross, in a peripheral sense, a prong 19 formed of the same material as the spool.

For ease of moulding the chordal compartments, 20, 21 22, 23 bounded on the outside by the peripheral wall 14 of the hub and on the inside by one of the chordal walls 16, 17, are open at the top and bottom, but the walls are united intermediately by webs 24. There are, therefore, in each flange two recesses 20, 22 or 21, 23 one on each side of the central hole 13.

In the moulding of a spool as hereinbefore described, there is provided a four-part mould. The first and second parts 25, 26 have flat, parallel faces, on which are formed bosses 27, acting as cores for the holes 13 in the spool flanges, and cores 28 for the recesses 20, 21, 22, 23. The parts 25, 26 are movable towards or away from one another along the axis of generation of the spool, and in FIGURE 3 they are shown in their withdrawn position.

In FIGURE 2 they are shown in their operative position, that is, spaced from one another by the thickness of the spool, and between them are two withdrawable cores 29, 30. These cores are movable towards or away from one another in a direction at right angles to the direction of movement of the parts 25, 26, and meet on the line 31. The core 29 has recesses 32, 33 in which are moulded those halves of the flanges 11, 12 lying to the left of the line 31 (FIGURE 1) and a central recess bounded by a cylindrical wall 34, to mate with a nose on the core 30 in a manner to be described, to form the hub 10.

The other core 30 has a projecting nose 35 extending diametrically from its central recess (see FIGURES 1 and 4) and arranged, when the mould is closed to abut against the opposing surface 34 of the core 29. The opposing surface 34 defines the exterior surface of part of the peripheral wall 14 of the hub 10, and it will therefore be seen that the diametrally extending nose 35, by being formed with a depression 36 at its free end in the form of the required prong 19, will cause to be defined in the peripheral wall the first window 18 having a rectangular exterior contour and an interior contour demarcating the shape of the prong 19, while simultaneously the intermediate portion of the diametral nose will cause to be formed the passageway 15 diametrically opposite the prong. This passageway 15 serves for the withdrawal of the diametral core.

Although there has been described an embodiment with two circular flanges, the invention may be applied to other forms of spool. Thus there are spools with only one flange, or with no flanges; flanges may be non-circular, e.g., square; the central hole may be rectangular, or round, or of other shape; and there may be recesses in one flange, but not the other, of a two-flanged spool. It will be appreciated that the invention is applicable to spools having these or other characteristics.

What it is desired to secure by Letters Patent is:

I claim:

1. In a ribbon spool for a business machine, a one-piece, hollow cylindrical hub of molded plastic and open at opposite ends thereof for receiving a spindle therethrough, said hub having a circumferential wall of substantially C-shaped cross-section to provide a passageway into the hub between the free ends of and extending the entire length of said wall, said wall having a window therein opposite said passageway, said window having a prong member integral with a wall of the window and extending partially across said window in the general curved plane of said wall, said hub having a pair of chordal walls on the interior thereof extending from said free ends to said circumferential wall on opposite sides of said window.

2. A one-piece spool of molded plastic comprising, a central, hollow hub of substantially cylindrical formation having a central bore opening to opposite ends of the hub for receiving a spindle therethrough, said hub having a circumferential wall describing an arc less than 360 degrees and providing a pair of free ends extending the length of the hub, a pair of parallel flanges integral with said hub and having said hub sandwiched therebetween, said wall having a pair of inwardly extending chordal walls conjoined between said free ends and circumferential wall and defining therebetween a passageway into the hub, said circumferential wall having a window therein opposite said passageway and said window having a prong formation integral with a wall of the window and extending into said window in the general plane of said circumferential wall, at least one of said flanges having recesses therethrough on opposite sides of said bore and communicating with the interior of said hub.

3. The structure as described in claim 1 in which said chordal walls and said circumferential wall are of substantially identical thickness and said chordal walls are parallel and spaced apart a distance equal to the width of said window.

4. The structure as described in claim 1 in which each chordal wall and the circumferential wall are conjoined to define a recess spaced from and on opposite sides of said window.

5. A spool as described in claim 2 in which said walls and flanges are of substantially identical thickness.

6. A spool as described in claim 2 in which each chordal wall has a web portion intermediate opposite ends thereof connecting same to said circumferential wall.

References Cited in the file of this patent

UNITED STATES PATENTS

| | | |
|---|---|---|
| 2,232,461 | Kuckoff | Feb. 18, 1941 |
| 2,366,147 | May | Dec. 26, 1944 |
| 2,448,676 | MacMillin et al. | Sept. 7, 1948 |
| 2,457,336 | Wilson | Dec. 28, 1948 |
| 2,483,528 | Christoff | Oct. 4, 1949 |
| 2,552,222 | Schulz et al. | May 8, 1951 |
| 2,672,653 | Simpkins et al. | Mar. 23, 1954 |
| 2,809,738 | Lambert | Oct. 15, 1957 |
| 2,859,919 | Debrie | Nov. 11, 1958 |
| 2,881,985 | Overmire et al. | Apr. 14, 1959 |
| 2,956,309 | Herbst | Oct. 18, 1960 |

FOREIGN PATENTS

| | | |
|---|---|---|
| 768,612 | Great Britain | Feb. 20, 1957 |
| 1,178,623 | France | May 13, 1959 |